United States Patent
Fisch

Patent Number: 5,831,200
Date of Patent: Nov. 3, 1998

[54] HANGER FOR A MISSILE IN A LAUNCHER

[75] Inventor: Peter Gerd Fisch, Überlingen, Germany

[73] Assignee: Bodenseewerk Geratetechnik GmbH, Uberlinger, Germany

[21] Appl. No.: 780,277

[22] Filed: Jan. 9, 1997

[30] Foreign Application Priority Data

Jan. 9, 1996 [DE] Germany .................. 196 00 494.2

[51] Int. Cl.⁶ .................. F41F 5/00; F41F 7/00
[52] U.S. Cl. .................. 89/1.819
[58] Field of Search .................. 89/1.819, 1.806; 244/63

[56] References Cited

U.S. PATENT DOCUMENTS

| | | | |
|---|---|---|---|
| 3,040,629 | 6/1962 | Duncan et al. | 89/1.819 |
| 3,195,406 | 7/1965 | Toomey, Jr. | 89/1.819 |
| 4,155,286 | 5/1979 | Mihm | 89/1.819 |
| 4,392,411 | 7/1983 | Minkler | 89/1.819 |
| 4,976,183 | 12/1990 | Norrvi et al. | 89/1.819 |

*Primary Examiner*—Michael J. Carone
*Assistant Examiner*—Matthew J. Lattig
*Attorney, Agent, or Firm*—Mallinckrodt & Mallinckrodt

[57] ABSTRACT

A hanger of steel for guiding a missile in a launcher has arcuate flanges matching the shape of the missile an a guiding element of substantially T-shaped cross section. A longitudinal recess is defined on the outer side of the transverse bar of the "T". The surfaces of the transverse bar facing the flanges define rest surfaces and the adjacent lateral surfaces of the vertikal bar of the "T" serve as lateral guiding surfaces for the missile. A longitudinal, rounded recess is provided between each of the lateral surfaces and the adjacent rest surface, in order to increase the notch radius. The surface of the material is treated to generate internal compressive stress in the regions of the recesses.

9 Claims, 7 Drawing Sheets

(PRIOR ART)

Fig. 6

(PRIOR ART)

HANGER FOR A MISSILE IN A LAUNCHER

BACKGROUND OF THE INVENTION

The invention relates to a hanger of steel for guiding a missile in a launcher. The hanger has arcuate flanges matching the shape of the missile and a profiled guide portion of substantially T-shape. A longitudinal recess is defined on the outer side of the "transverse bar" of the "T" extending across the whole length of the guide portion. The faces of the transverse bar facing the flanges serve as rest surfaces, and the adjacent side faces of the "vertical bar" of the "T" serve as lateral guiding surfaces for the missile.

Target tracking missiles are known, which are mounted in a launcher at the wings of a fighter aircraft. The mounting includes a slide shoe or hanger, which is attached to the missile. This hanger has a part of substantially T-shaped cross section. This T-shaped part is guided in a corresponding guide channel of the launcher. The missile is retained axially by means of a locking catch to prevent sliding out of the launcher. Upon firing of the missile, the locking catch releases the missile. When leaving the launcher, the hanger has to pass by the locking pawl. In order to make this possible, a recess has to be provided at the T-shaped part on the outer side of the transverse bar of the "T", this recess extending longitudinally over all of the part. This recess permits the hanger to pass by the locking pawl, when the missile is fired. With prior art missiles, the hanger consists of cast steel. Furthermore, the hanger has arcuate flanges matching the shape of the missile and is attached to the missile with these flanges.

The dimensions of the guide channel and of the hanger are standardized within NATO. Therefore, it is not possible to substantially deviate from these predetermined dimensions.

Modern fighter aircraft become increasingly faster and more manoeverable. Correspondingly, very high transverse accelerations occur. The inertial forces resulting therefrom act on the mounting of the missile and, in particular, load the hanger. This results in considerable strains within the hanger and may cause the hanger to break. Reinforcement of the hanger are limited because of the standardization. It must be possible to introduce the hanger into any type of launcher, also into already present ones.

DISCLOSURE OF THE INVENTION

It is the object of the invention to substantially increase the strength of hangers of the type mentioned in the beginning, without exceeding the dimensions determined by the standardization.

According to a general aspect of the invention, in order to achieve this object, a hanger of the type mentioned in the beginning has a longitudinal, rounded recess between each of the side faces and the respective adjacent one of the rest surfaces to increase the notch radius. In addition, the surface of the steel is treated in the area of these recesses to generate internal compressive stress.

The invention is based on an investigation of the strains which occur in a hanger of the present type. It has been found that these strains occur, above all, in the notch between the rest surfaces formed on the missile side at the transverse bar of the "T" and the adjacent side faces of the vertical bar of the "T". Accordingly, the invention increases the notch radius in the region of these notches by a recess. At the same time, there is a surface treatment such that internal compressive stress is generated. Thus the standardized dimensions are not exceeded. Material is removed in comparison to the prior art hangers. By reducing the strains occurring at the increased notch radius in combination with the generation of internal compressive stress, the strength is increased relative to the prior art hangers in spite of the removal of material. It has, surprisingly, been found that a hanger modified in this way can meet the increased requirements caused by modern aircraft.

Internal compressive forces can be generated by a number of known methods, for example by cold-working such as shot-peening, carbonizing, nitrifying or ion implantation of "larger" atoms than those of the basic material (sputtering).

Further modifications of the invention are described in the following description of preferred embodiments and are claimed in the appended claims.

Embodiments of the invention will be described hereinbelow with reference to the accompanying drawings.

PREFERRED EMBODIMENTS OF THE INVENTION

Figure 1:
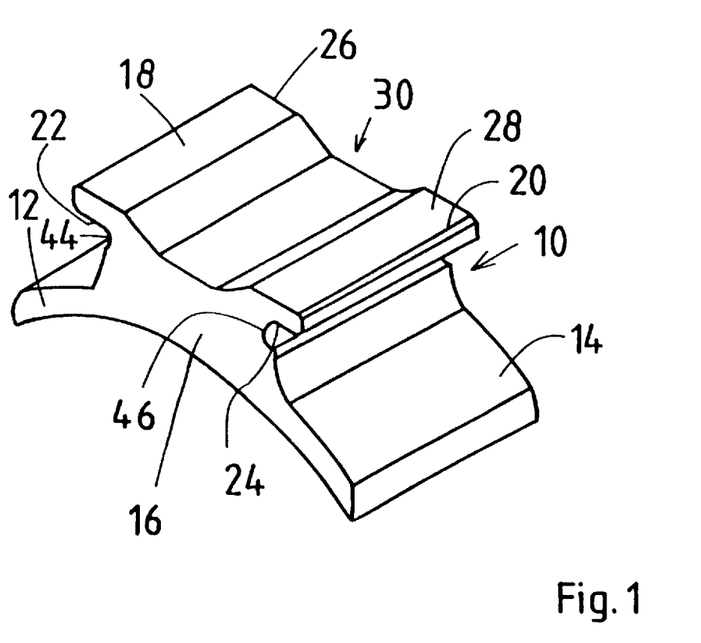
Fig. 1 is a perspective illustration of a hanger for guiding a missile in a launcher.
Figure 2:
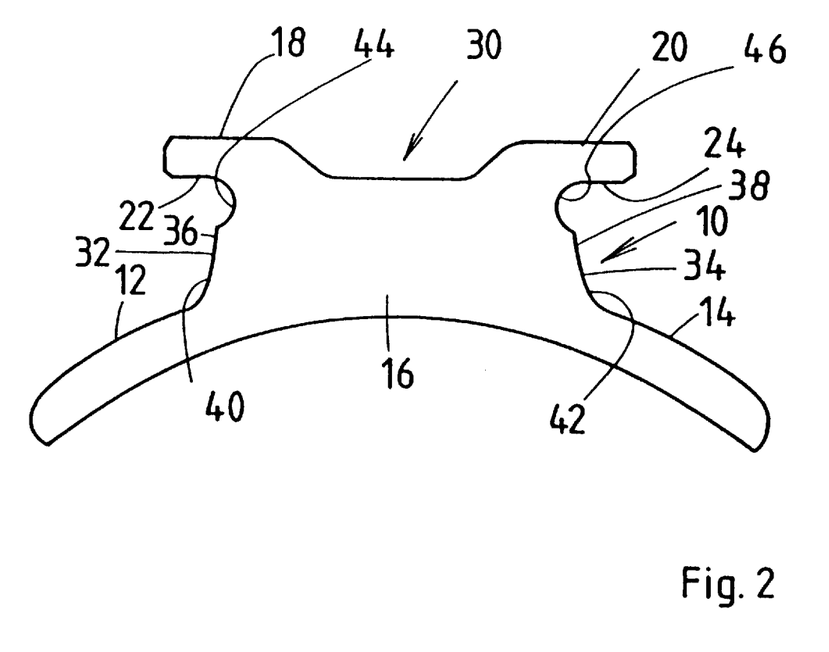
FIG. 2 is a cross-sectional view of the hanger.

The hanger 10 has two flanges 12 and 14, which are cylindrically curved and match the shape of a missile (not shown). The hanger proper has T-shaped cross section with a relatively wide central portion 16 representing the vertical bar of the "T" and rest flanges 18 and 20, which represent the transverse bar of the "T".

The supporting flanges 18 and 20 have missile-side rest surfaces 22 and 24, respectively, and supporting surfaces 26 and 28, respectively, parallel thereto and remote from the missile. A recess 30 of rounded-trapezoidal cross section extends longitudinally across the hanger 10 on the outer side of the transverse bar of the "T" between the rest flanges 18 and 20.

The central portion 16 has opposite side faces 32 and 34. The side faces of the central portion 16 or the vertical bar of the "T" have parallel, plane surface portions 36 and 38, which serve as the guiding surfaces proper. The central portion 16 or vertical bar of the "T" has concave surface portions 40 and 42 communicating with the plane surface portions 36 and 38, respectively, and thereby becomes wider towards the flanges 12 and 14, respectively.

In order to increase the notch radius, a longitudinally extending, rounded recess 44 or 46 is formed between each of the lateral faces 32 or 34 and the ajacent rest surface 22 and 24, respectively. The surface of the material is treated in the regions of the recesses 44 and 46 to generate internal compressive strains.

Because of the recesses, the notch radius is increased. Thereby, notch strains are reduced. This is achieved without exceeding the standardized profile of the hanger. Because of the generation of internal compressive strains in the regions of the recesses 44 and 46, the maximum tensional strains occuring between the rest surfaces 22 and 24 and the lateral surfaces 32 and 34, respectively, are further reduced.

There are various well-known methods for generating the internal compressive strains: The internal compressive strains can be generated by cold working. The cold-working can be achieved by shot-peening or pressing. Other ways are carbonizing or nitifying. By ion implantation (sputtering), atoms of larger "caliber" than that of the atoms of the basic material can be built into the lattice of the basic material in the regions of the recesses 44 and 46.

The hanger may consist of surface-treated cast steel 1.4549. It is also possible that the hanger consists of high-strength forged steel, preferably of surface-treated maraging steel 1.6354. In order to further reduce the risk of rupture of the material, the surface of the hanger 10 is polished at least in the regions of the recesses 44 and 46.

Dimensions of the hanger are obtained by an optimizing procedure. The hanger is modelled in a "finite-element model". For a typical, critical load case, the strains are determined in accordance with the "normal-strain hypothesis". The determined strains serve as reference for the subsequent optimizing steps. With these optimizing steps, the various parameters, namely the notch radius in the region between the rest surfaces 22 and 24 and the lateral surfaces 32 and 34, respectively, and the with of the recess 30, are varied. The variaton of the notch radius without exceeding the profile determined by the standardization is permitted by the recesses 44 and 46. Optimal geometry is assumed, is no further reduction of the strains is achieved by changes of the geometry within the profile permissible by the standardization. In subsequent steps, ways of improvement by surface treatment and material selection are investigated and computed.

The optimization steps are compiled in table 1:

Starting from a prior art hanger (first column), a first optimization step consists in varying, at first, the notch radius $r_k$, i.e. the radii of the rounded recesses 44 and 46. These are the optimization steps IT1 and IT2. This results in a notch radius of $r_k$=3 mm. When the remaining geometry is retained, increase of the $r_k$ does not permit further reduction of the maximum strain $\sigma_{max}$, i.e. of the maximum strain occurring at the transition between rest and lateral surfaces 22,24 and 32,34, respectively. Then the width of the recess 30 is reduced from 10.414 mm to 7.5 mm with optimization steps IT3 and IT4. This is the minimum width, with which the recess 30 exceeds the width of a locking latch holding the missile in the launcher by just the admissible tolerances. With the thus reduced width of the recess 30, an optimum for the notch radius $r_k$ of 4.0 mm with a main strain of $\sigma_{max}$ of 1850 MPa (Megapascal) is obtained.

The same values are obtained with the lateral guiding of the hanger 10 through the guiding surfaces 36 and 38. Thanks to the change of shape, the main strain $\sigma_{max}$ is reduced by 18 percent from 2260 MPa to 1850 MPa.

Internal compressive strains are generated in the hanger thus optimized with respect to its shape by surface treatment, at least in the region of the recesses 44 and 46. This results in a reduction of the main strain $\sigma_{max}$ by 37 percent (with cast steel 1.4549) to 1430 MPa. With lateral guiding and the use of very high-strength steel 1.6354, a reduction of the main strain $\sigma_{max}$ by 31 percent to 1560 MPa is obtained.

Table 2 shows the relative stability under load of a hanger optimized in the manner described as a function of the material and of the treating or non-treating of the surface to achieve internal compressive strains.

TABLE 2

| relative stability under load | prior art | Optimum with/without lateral guiding |
|---|---|---|
| 1.4549 | 1 | 1.22 |
| 1.4549 surface-treated | | 1.58 |
| 1.6354 | 1.82 | 2.23 |
| 1.6354 surface-treated | | 2.64 |

By using maraging steel, there is a stability under load increased by a factor of 1.82 as compared to cast steel

TABLE 1

| | prior art | IT1 | IT2 | IT3 | IT4 | Optimum | Optimum with lateral guiding |
|---|---|---|---|---|---|---|---|
| notch radius $r_k$ [m] | 1.65 | 2.5 | 3.0 | 3.0 | 3.5 | 4.0 | 4.0 |
| recess $r_s$ $r_o$ [mm] | 10.441 | 10.414 | 10.414 | 7.5 | 7.7 | 7.5 | 7.5 |
| main strain $\sigma_{max}$ [MPa] | 2260 | 2040 | 1960 | 1940 | 1870 | 1850 | 1850 |
| main strain surface treated $\sigma_{max}$ [MPa] | | | | | | 1430 | 1560 (1.6354) |
| strain reduction [%] | | 10 | 13 | 14 | 17 | 18 | 18 |
| strain reduction surface treated [%] | | | | | | 37 | 31 (1.6354) |

1.4549, even without surface treatement and optimization of the shape of the hanger. The optimization of the shape with cast steel 1.4549 provides an improvement of the stability under load by a factor of 1.22. If the optimized hanger of cast steel 1.4549 subjected to a surface treating to generate internal compressive strain in the region of the recesses 44 and 46, the stability under load is increased by a factor of 1.58 as compared to the prior art. When using maraging steel 1.6354, the optimization of the shape provides an improvement of the stability under load by a factor of 2.23 as compared to the prior art. If this maraging steel 1.6354 is surface treated to achieve internal compressive strain, an increase of the stability under load by a factor 2.64 as compared to the prior art is achieved.

It will be noted that simply the use of maraging steel 1.6354 without optimization of the shape and without surface treating provides a substantially larger increase of the stability under load than the optimization of the shape and the surface treating with cast steel 1.4549. Therefore, the question might arise, whether optimization of a hanger of cast steel 1.4549 is reasonable at all. It is, however, to be taken into consideration that the "standard material" used up to now is more easily to be worked and is less expensive. In addition, the fatigue strength of the optimized and surface treated hanger of cast steel 1.4549 is better than that of the very high-strength steel, even with optimization and surface treatment. This can be seen from the following table:

TABLE 3

| relative stability under load | prior art | Optimum with/without lateral guiding |
| --- | --- | --- |
| 1.4549 | 1 | 1.22 |
| 1.4549 surface-treated | | 1.58 |
| 1.6354 | .96 | 1.18 |
| 1.6354 surface-treated | | 1.40 |

Table 3 shows the relative stability under load of optimized and non-optimized, surface-treated and non-surface-treated hangers of cast steel 1.4549 and very high-strength 1.6354 in the fatigue range, i.e. in the range of $10^7$ load alternations. It will be noted that the stability under load in the fatigue range is lower for the very high-strength steel than for the cast steel 1.4549. This is true both without optimization of the shape and with optimized shape and with surface treating. The optimum of the stability under load with an improvement by a factor of 1.58 as compared to the prior art (AIM-9L) is achieved with the hanger of cast steel 1.4549 optimized with respect to shape and surface-treated.

Thus, though the use of very high-strength steel such as maraging steel 1.6354 offers advantages in the low number-of-load-alternations range, a hanger out of this material falls behind a hanger out off cast steel 1.4549 with respect to stability under load in the fatigue range ($10^7$ load alternations). The use of hangers of surface-treated cast steel is advantageous with long mission times causing frequent load alternations at moderate loads. The use of very high-strength steel is preferable and, maybe, necessary, if the hanger has to be dimensioned for loads which result from rather seldom occurring extreme manoevers of the aircraft.

Figure 3:
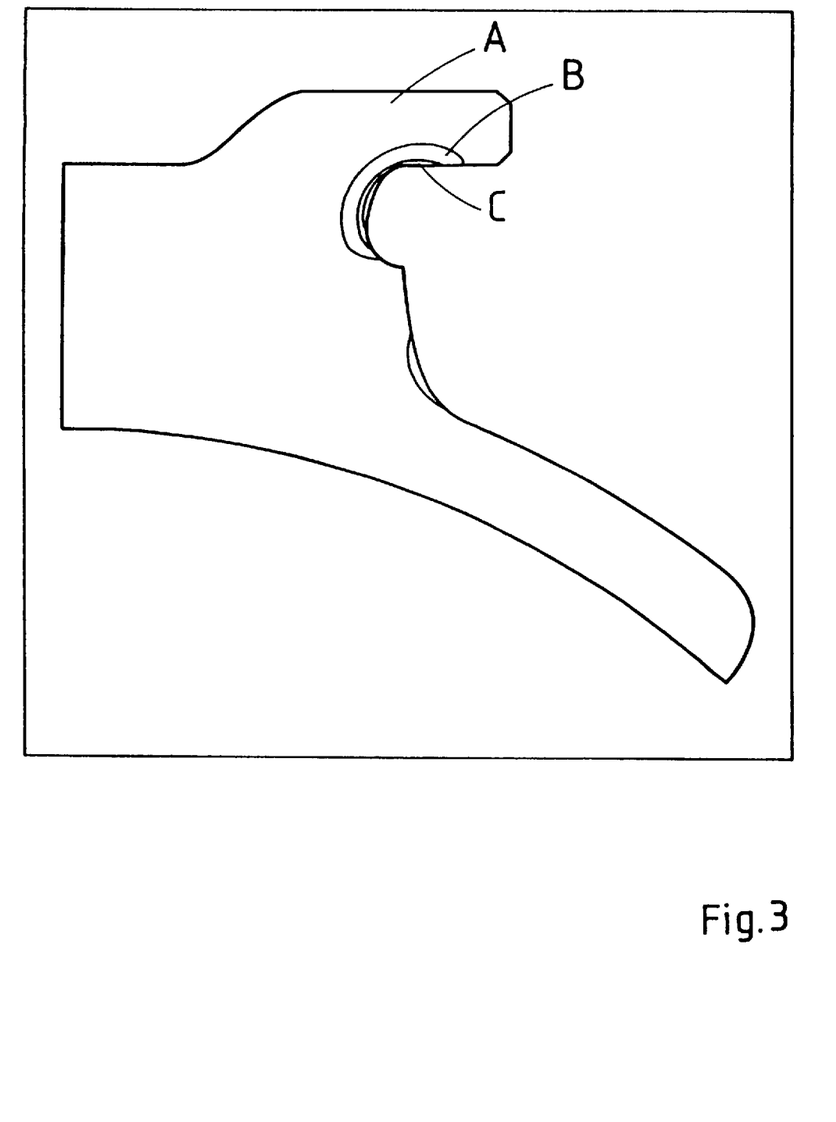
FIG. 3 shows the distribution of strains in the hanger.

FIG. 3 illustrates the strain distribution in the hanger of FIGS. 1 and 2, computed in accordance with the normal strain hypothesis. Three areas designated by A, B and C are to be distinguished. The strain in the area A is below 500 MPa. In the area B, strains up to 1000 MPa occur. In the area C, there are strains up to 1300 MPa. In detail, the strain distribution in the region of the recess 46 can be seen from FIG. 4. There, the strain in an area D is up to 200 MPa. In an area E strains up to 410 MPa are observed. In an area F strains up to 615 MPa are observed. In an area G strains up to 1030 MPa are observed. In an area H strains up to 1230 MPa are observed. In an area I strains up to 1440 MPa are observed. In an area J strains up to 1640 MPa are observed. In an area K the strain raises up to 1850 MPa. The latter strain is the main strain $\sigma_{max}$ of table 1.

Figure 5:
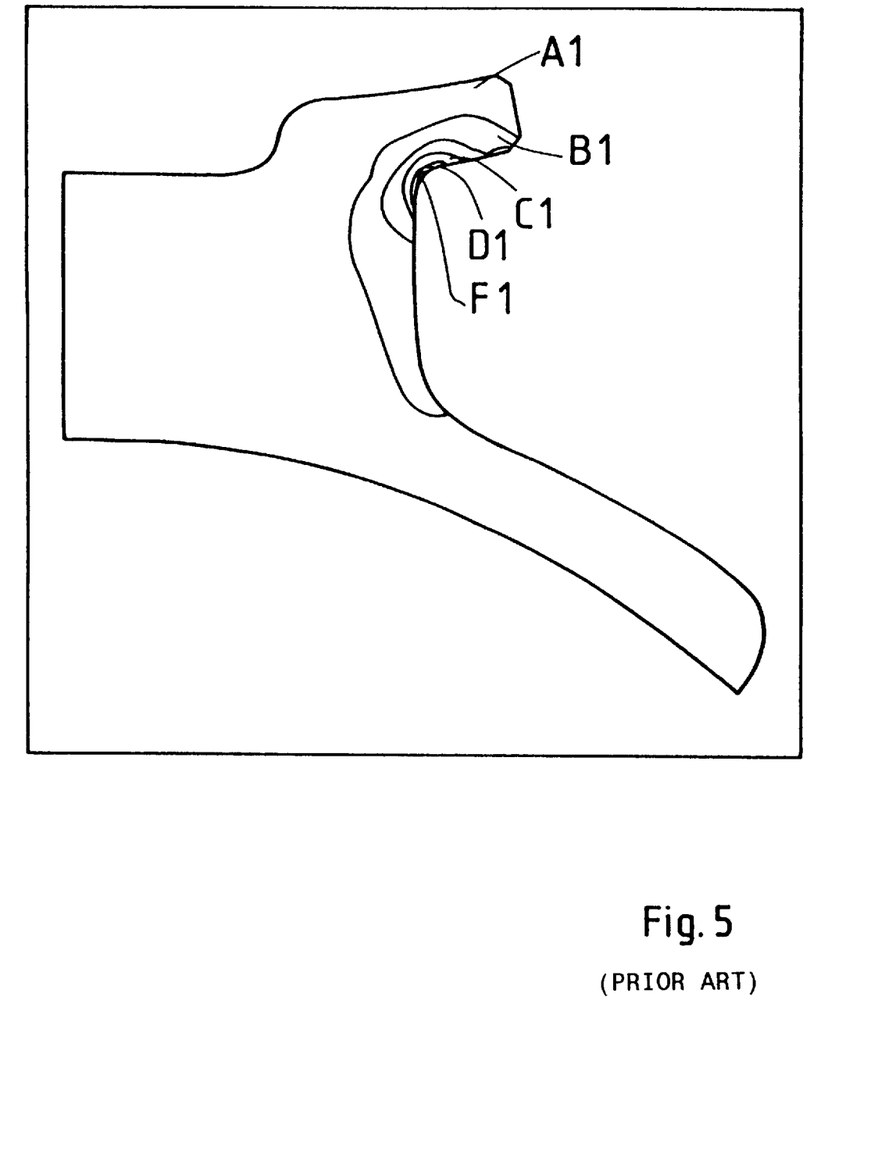
FIG. 5 is an illustration similar to FIG. 3 and shows, for comparison, the distribution of strains in a prior art hanger.
Figure 6:
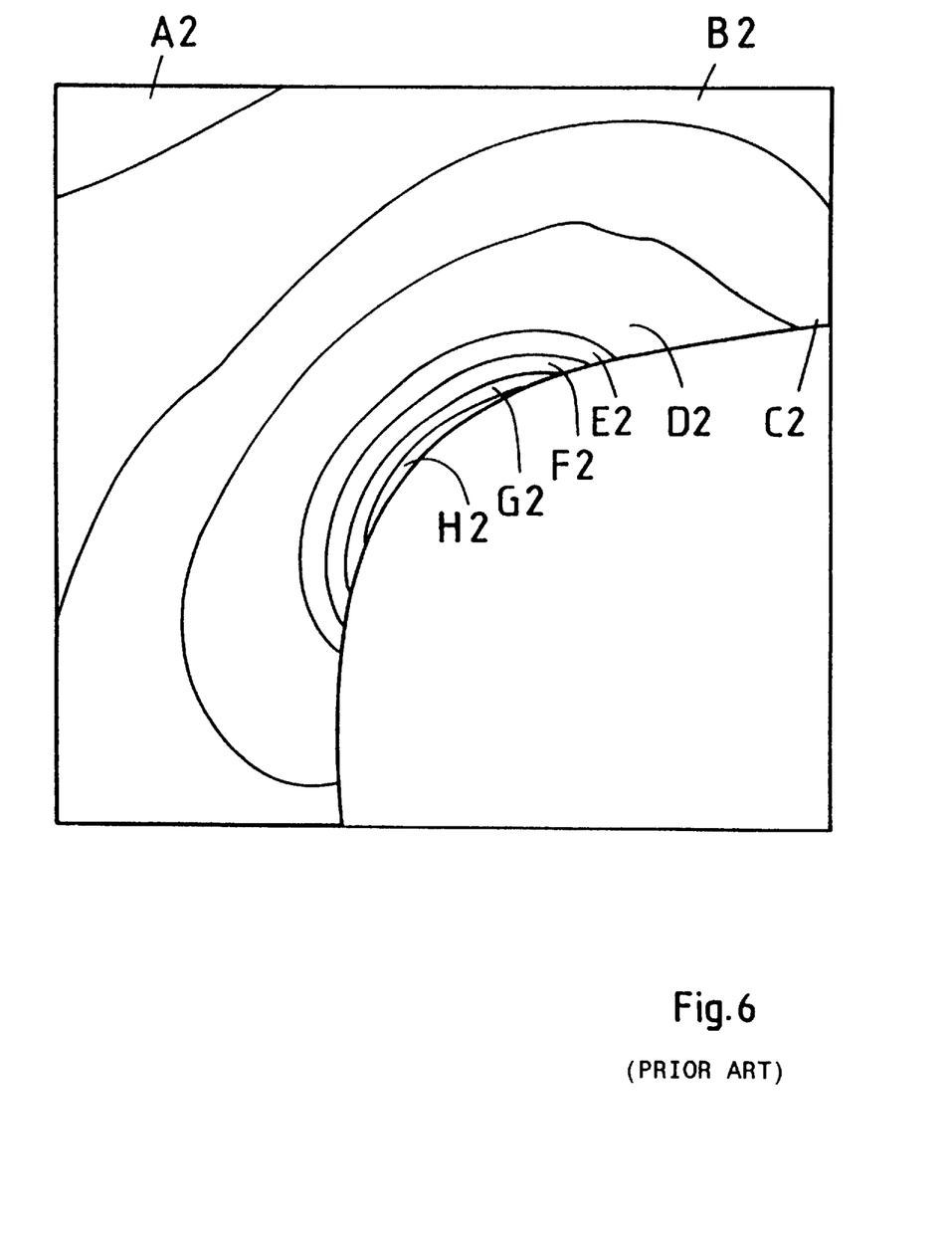
FIG. 6 is an illustration similar to FIG. 4 and shows, for comparison, the distribution of strains in a prior art hanger.

For comparison, FIGS. 5 and 6 show the strain distribution in a hanger of the prior art.

In an area A1 in FIG. 5, strains up to 250 MPa are observed. In an area B1, strains up to 500 MPa are observed. In an area C1, strains up to 750 MPa are observed. In an area D1, strains up to 1760 MPa are observed. In an area E1, strains up to 2260 MPa are observed. The latter strain is, again, the main strain $\sigma_{max}$ of table 1.

Figure 4:
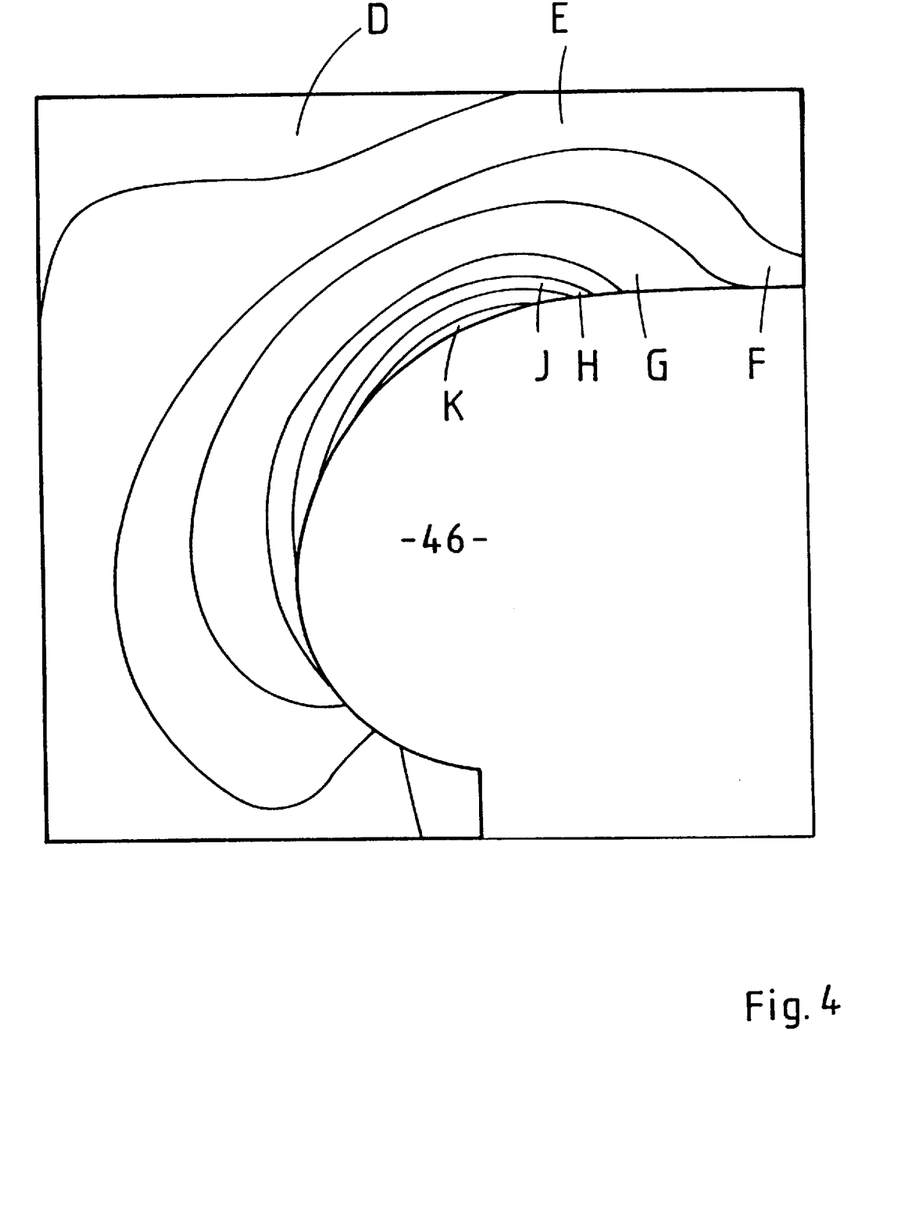
FIG. 4 shows the distribution of strains in the hanger in the region of the recess between the rest surface and the lateral guiding surface.

FIG. 6 illustrates, in a similar way as FIG. 4, the strain distribution in the region of the transition from the rest surface and the guiding surface of the hanger (corresponding to items 24 and 38 in FIG. 2).

In an area A2, strains of up to 250 MPa are observed. In an area B2, strains of up to 500 MPa are observed. In an area C2, strains of up to 750 MPa are observed. In an area D2, strains of up to 1260 MPa are observed. In an area E2, strains of up to 1500 MPa are observed. In an area F2, strains of up to 1760 MPa are observed. In an area G2, strains of up to 2010 MPa are observed. Eventually, the strains raise to 2260 in an area H2, this strain being the main strain $\sigma_{max}$ in table 1.

Figure 7:
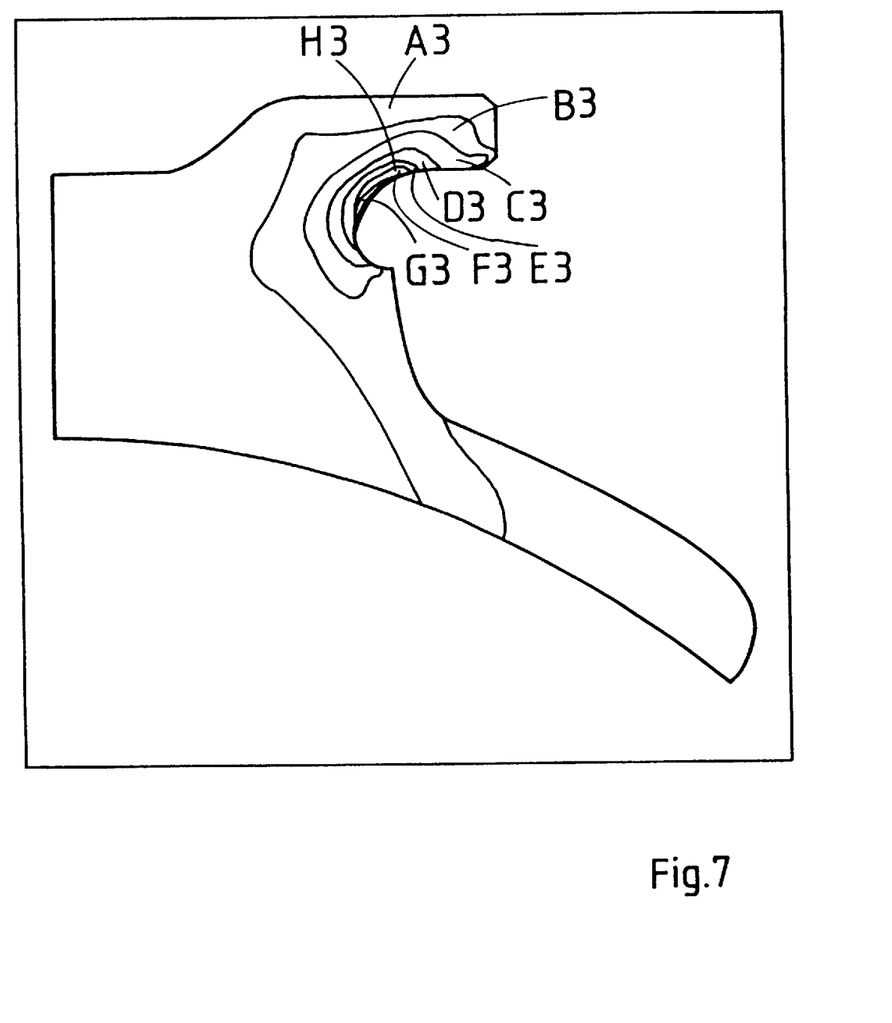
FIG. 7 is an illustration similar to FIG. 3 and shows the distribution of strains in a hanger shaped as shown in FIGS. 1 and 2, the surface of the material being treated to generate internal compressive forces.
Figure 8:
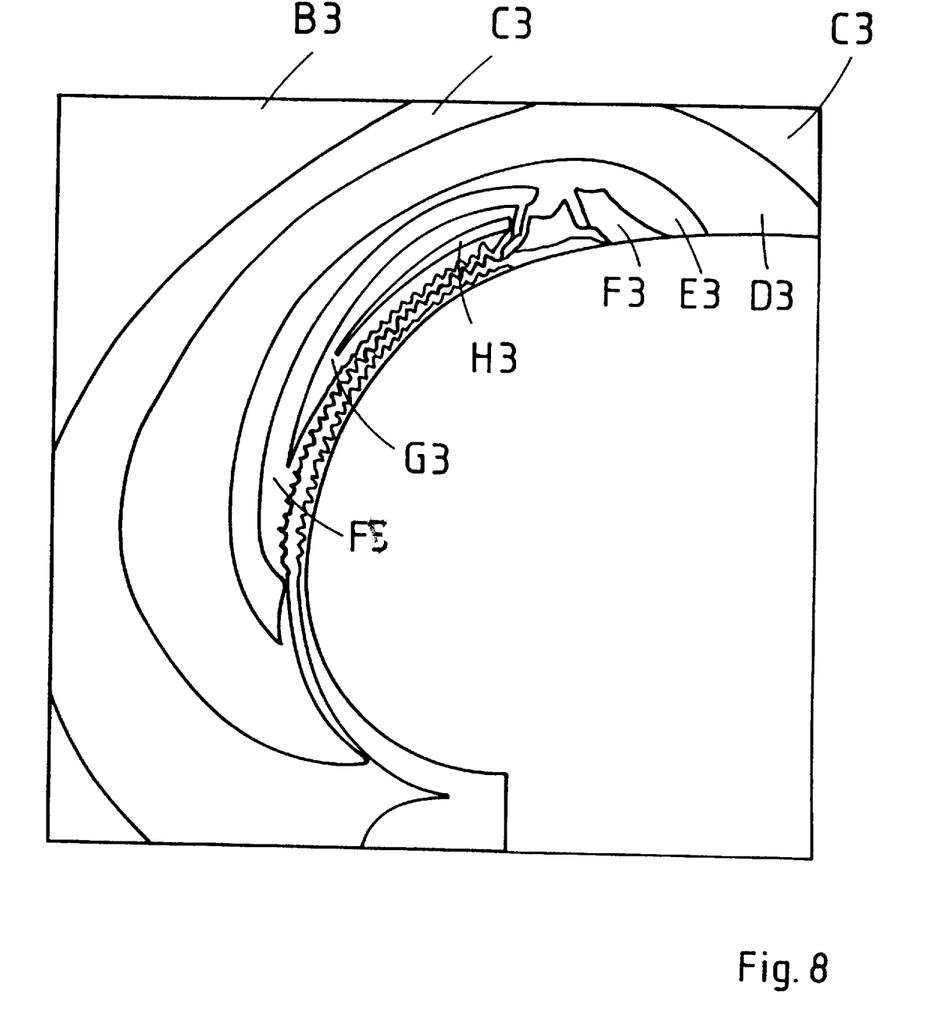
FIG. 8 is an illustration similar to FIG. 4 and shows the distribution of strains in a hanger shaped as shown in FIGS. 1 and 2, the surface of the material being treated to generate internal compressive forces.

FIGS. 7 and 8 are illustrations similar to FIGS. 3 and 4 for a hanger of very high-strength steel 1.6354, an internal compressive strain being generated in the material by surface treating.

In FIG. 7, eight areas A3 to H3 can be recognized. In an area A3, strains up to 175 MPa are observed. In an area B3, strains up to 350 MPa are observed. In an area C3, strains up to 520 MPa are observed. In an area D3, strains up to 870 MPa are observed. In an area E3, strains up to 1050 MPa are observed. In an area F3, strains up to 1210 MPa are observed. In an area G3, strains up to 1390 MPa are observed. Eventually, there are strains up to 1560 MPa in an area H3. This, again, is the value of the main strain $\sigma_{max}$ given in table 1 line 5, right column.

In FIG. 8, the areas are designated in the same way as in FIG. 7. As can be seen best from FIG. 8, the area of maximum strain, namely H3 is not located at the surface but is enclosed by areas of lower strain. This effect is caused by the internal compressive strain.

I claim:

1. A hanger of steel for guiding a missile in a launcher, said hanger being profiled and having a substantially constant cross sectional shape as viewed in a longitudinal direction, in which the missile is to be guided, and comprising arcuate flanges and a profiled guide portion of substantially T-shaped cross section, the guide portion having a transverse portion corresponding to the horizontal bar of the "T" and a central portion normal to the transverse portion corresponding to the vertical bar of the "T" and integral with said flanges, said central portion having opposite side faces, the transverse portion having an outer surface and, on opposite sides of said central portion, surfaces facing said flanges, the outer surface of the transverse portion defining a longitudinally extending recess across the outer surface, the surfaces of the transverse portion facing said flanges defining rest surfaces adjacent to the side faces and said side faces of the central portion defining lateral guiding surfaces for guiding the missile in the launcher, a longitudinal, rounded recess being provided between each of said side faces and the respective adjacent one of said rest surfaces to increase the notch radius, and the surface of the steel being treated in the area of said longitudinal, rounded recesses to generate internal compressive stress.

2. A hanger as claimed in claim 1, wherein said longitudinal, rounded recess in the outer surface of the transverse portion exceeds the width of a locking pawl retaining the missile in the launcher by admissible tolerances only.

3. A hanger as claimed in claim 1, wherein said side faces of said central portion define parallel, plane surfaces communicating with said rounded recesses, said plane surfaces serving as guiding surfaces proper, said central portion having concave surface portions communicating with said plane surfaces, whereby the thickness of the central portion is gradually increased towards said flanges.

4. A hanger as claimed in claim 1, consisting of cast steel.

5. A hanger as claimed in claim 4, wherein said cast steel is cast steel 1.4549.

6. A hanger as claimed in claim 1, consisting of high-yield-point forged steel.

7. A hanger as claimed in claim 6, wherein said forged steel is surface-treated maraging steel 1.6354.

8. A hanger as claimed in claim 1, wherein the finishing of the surface of the hanger is improved by treatment in the regions of said rounded recesses.

9. A hanger as claimed in claim 1, wherein said surfaces of said rounded recesses are polished.

* * * * *